United States Patent
Wang et al.

(10) Patent No.: US 10,803,546 B2
(45) Date of Patent: Oct. 13, 2020

(54) SYSTEMS AND METHODS FOR UNSUPERVISED LEARNING OF GEOMETRY FROM IMAGES USING DEPTH-NORMAL CONSISTENCY

(71) Applicant: Baidu USA, LLC, Sunnyvale, CA (US)

(72) Inventors: Peng Wang, Sunnyvale, CA (US); Wei Xu, Saratoga, CA (US); Zhenheng Yang, Los Angeles, CA (US)

(73) Assignee: Baidu USA LLC, Sunnyvale, CA (US)

( * ) Notice: Subject to any disclaimer, the term of this patent is extended or adjusted under 35 U.S.C. 154(b) by 273 days.

(21) Appl. No.: 15/803,391

(22) Filed: Nov. 3, 2017

(65) Prior Publication Data

US 2019/0139179 A1    May 9, 2019

(51) Int. Cl.
*G06K 9/60* (2006.01)
*G06K 9/54* (2006.01)
(Continued)

(52) U.S. Cl.
CPC ............ *G06T 1/20* (2013.01); *G06N 3/084* (2013.01); *G06N 3/088* (2013.01); *G06T 3/0093* (2013.01);
(Continued)

(58) Field of Classification Search
CPC ........... G06K 9/00664; G06K 9/00671; G06K 9/00214; G06K 9/4652; G02B 27/0172;
(Continued)

(56) References Cited

U.S. PATENT DOCUMENTS 9,053,562 B1 * 6/2015 Rabin ................... G06F 16/583
9,824,417 B2 * 11/2017 Kim ........................ G06F 3/017
(Continued)

OTHER PUBLICATIONS

Li et al., Depth and surface normal estimation from monocular images using regression on deep features and hierarchical CRFs, CVPR 2015, Computer Vision Foundation, pp. 1119-1127.*
(Continued)

*Primary Examiner* — Guillermo M Rivera-Martinez
(74) *Attorney, Agent, or Firm* — North Weber & Baugh LLP (57) ABSTRACT

Presented are systems and methods for 3D reconstruction from videos using an unsupervised learning framework for depth and normal estimation via edge-aware depth-normal consistency. In embodiments, this is accomplished by using a surface normal representation. Depths may be reconstructed in a single image by watching unlabeled videos. Depth-normal regularization constrains estimated depths to be compatible with predicted normals, thereby, yielding geometry-consistency and improving evaluation performance and training speed. In embodiments, a consistency term is solved by constructing depth-to-normal layer and normal-to-depth layers within a deep convolutional network (DCN). In embodiments, the depth-to-normal layer uses estimated depths to compute normal directions based on neighboring pixels. Given the estimated normals, the normal-to-depth layer may then output a regularized depth map. Both layers may be computed with awareness of edges within the image. Finally, to train the network, the photometric error and gradient smoothness for both depth and normal predictions may be applied.

20 Claims, 6 Drawing Sheets (51) Int. Cl.
*G06T 1/20* (2006.01)
*G06T 5/00* (2006.01)
*G06T 7/579* (2017.01)
*G06N 3/08* (2006.01)
*G06T 3/00* (2006.01)

(52) U.S. Cl.
CPC ............. *G06T 5/002* (2013.01); *G06T 7/579* (2017.01); *G06T 2207/10016* (2013.01); *G06T 2207/10028* (2013.01); *G06T 2207/20081* (2013.01)

(58) Field of Classification Search
CPC ............. G02B 2027/0138; G06F 16/50; G06F 16/5838; G06T 2200/04; G06T 2207/10024
See application file for complete search history.

(56) References Cited

U.S. PATENT DOCUMENTS

| | | | | |
|---|---|---|---|---|
| 2004/0095374 | A1* | 5/2004 | Jojic | G06T 7/215 715/716 |
| 2010/0111370 | A1* | 5/2010 | Black | G06K 9/00369 382/111 |
| 2011/0188773 | A1* | 8/2011 | Wei | G06K 9/40 382/260 |
| 2013/0230237 | A1* | 9/2013 | Schlosser | G06T 7/11 382/164 |
| 2014/0293091 | A1* | 10/2014 | Rhoads | G01J 3/513 348/234 |
| 2015/0030234 | A1* | 1/2015 | Lenseigne | G06T 7/507 382/154 |
| 2015/0055855 | A1* | 2/2015 | Rodriguez | G06F 21/16 382/159 |
| 2016/0026253 | A1* | 1/2016 | Bradski | G02B 27/225 345/8 |
| 2016/0261844 | A1* | 9/2016 | Kadambi | G01B 11/24 |
| 2017/0032222 | A1* | 2/2017 | Sharma | G06K 9/4619 |
| 2017/0278289 | A1* | 9/2017 | Marino | G06T 7/44 |
| 2018/0082172 | A1* | 3/2018 | Patel | G06N 3/0472 |
| 2018/0234671 | A1* | 8/2018 | Yang | G06K 9/6256 |
| 2018/0286061 | A1* | 10/2018 | Shen | G06T 7/62 |
| 2019/0087712 | A1* | 3/2019 | Sundaresan | G06N 3/0454 |
| 2019/0096035 | A1* | 3/2019 | Li | G06T 3/4053 |
| 2019/0130630 | A1* | 5/2019 | Ackerson | G06T 9/40 |
| 2019/0146497 | A1* | 5/2019 | Urtasun | G01S 17/023 701/27 |
| 2019/0213481 | A1* | 7/2019 | Godard | G06F 17/16 |
| 2019/0279383 | A1* | 9/2019 | Angelova | G06T 7/55 |

OTHER PUBLICATIONS

Xie et al.,"Deep3D: Fully automatic 2D-to-3D video conversion with deep convolutional neural networks,"Retrieved from Internet<https://arxiv.org/pdf/1604.03650.pdf>,2016(15pg).
Zhou et al.,"Unsupervised learning of depth and ego-motion from video," In CVPR, 2017 (10 pgs).
Li et al.,"Depth and surface normal estimation from monocular images using regression on deep features and hierarchical crfs," In CVPR, 2015 (1 pg).
Yuanwei Li,"Pyramidal gradient matching for optical flow estimation," arXiv preprint arXiv:1704.03217, 2017 (13 pgs).
Liu et al.,"Learning depth from single monocular images using deep convolutional Neural fields," Retrieved from Internet <URL: <https://arxiv.org/pdf/1502.07411v1.pdf>, 2015 (14 pgs).
Liu et al.,"Deep convolutional neural fields for depth estimation from a single image," Retrieved from Internet <URL: <https://arxiv.org/pdf/1411.6387v1.pdf>, 2014 (14 pgs).
Long et al.,"Fully convolutional networks for semantic segmentation," In CVPR, 2015 (10 pgs).

Mayer et al.,"A large dataset to train convolutional networks for disparity, optical flow, and scene flow estimation," In CVPR, 2016 (9 pgs).
Mur-Artal et al."ORB-SLAM: a versatile and accurate monocular slam system," IEEE Transactions on Robotics 31(5):1147-1163, 2015 (17 pgs).
Newcombe et al.,"DTAM: dense tracking and mapping in real-time," Retrieved from Internet <URL: <https://ieeexplore.ieee.org/document/6126513>,In ICCV, 2011 (2pgs).
Prados et al.,"Shape from shading,"Handbook of mathematical models in computer vision 375-388,2006, From Internet <URL: <https://hal.inria.fr/inria-00377417/document> (18pgs).
Zhongxiao Jia,"Using cross-product matrices to compute the SVS," Numerical Algorithms 42(1):31-61, 2006 (32 pgs).
Karsch et al.,"Depth transfer: Depth extraction from video using nonparametric sampling," Retrieved from Internet <URL: <http://people.csail.mit.edu/celiu/pdfs/ECCV12-autostereo.pdf>, IEEE transactions on pattern analysis & machine intelligence, 2014 (14 pgs).
Kong et al.,"Intrinsic depth: Improving depth transfer with intrinsic images," Retrieved from Internet <URL: <http://files.is.tue.mpg.de/nkong/iccv2015/IntrinsicDepth.pdf>, 2015 (9 pgs).
Kuznietsov et al.,"Semi-supervised deep learning for monocular depth map prediction," Retrieved from Internet <URL: <https://arxiv.org/pdf/1702.02706v1.pdf>, 2017 (9 pgs).
Ladicky et al.,"Discriminatively trained dense surface normal estimation," Retrieved from Internet <URL: <https://inf.ethz.ch/personal/pomarc/pubs/LadickyECCV14.pdf>, In ECCV, 2014 (17 pgs).
Ladicky et al.,"Pulling things out of perspective," Retrieved from Internet <URL: <https://inf.ethz.ch/personal/ladickyl/depth_cvpr14.pdf>, In CVPR, 2014 (8pgs).
Laina et al.,"Deeper depth prediction with fully convolutional residual networks," Retrieved from Internet <URL: <https://arxiv.org/pdf/1606.00373v1.pdf>, 2016 (17pgs).
Schwing et al.,"Box in the box: Joint 3D layout and object reasoning from single images," In ICCV, 2013. (8 pgs).
Silberman et al.,"Indoor segmentation and support inference from RGBD images," ECCV, 2012. (14 pgs).
Srajer et al.,"Match box: Indoor image matching via Box-like scene estimation," In 3DV, 2014. (8 pgs).
Vijayanarasimhan et al.,"SfM-Net: Learning of structure and motion from video," CoRR abs/1704.07804, 2017. (9 pgs).
Wang et al.,"Towards unified depth and semantic prediction from a single image," In CVPR, 2015. (10 pgs).
Wang et al.,"SURGE: surface regularized geometry estimation from a single image," In NIPS, 2016. (9 pgs).
Wang et al.,"Designing deep networks for surface normal estimation," Retrieved from Internet <URL:<https://arxiv.org/pdf/1411.4958.pdf>, 2014 (9 pgs).
Wu C.,"VisualSFM: A visual structure from motion system," Retrieved from Internet <URL: <http://ccwu.me/vsfm/doc.html>, 2011. (10pgs).
Xiao et al.,"SUN3D: A database of big spaces reconstructed using sfm and object labels," Retrieved from Internet <URL: <http://3dvision.princeton.edu/projects/2013/SUN3D/paper.pdf>, 2013. (8 pgs).
Abadi et al.,"TensorFlow: Large-scale machine learning on heterogeneous distributed systems," arXiv preprint arXiv:1603.04467, 2016 (19 pgs).
Eigen & Fergus,"Predicting depth, surface normals and semantic labels with a common multiscale convolutional architecture," In ICCV, 2015 (9 pgs).
Eigen et al.,"Depth map prediction from a single image using a multi-scale deep network," In NIPS, 2014 (9 pgs).
Garg et al.,"Unsupervised CNN for single view depth estimation: Geometry to the rescue," Retrieved from Internet <URL:https://arxiv.org/pdf/1603.04992v1.pdf>, 2016 (14 pgs).
Geiger et al.,"Are we ready for autonomous driving? The KITTI vision Benchmark suite," In CVPR, 2012 (8 pgs).
Godard et al.,"Unsupervised monocular depth estimation with left-right consistency," Retrieved from Internet <URL: https://arxiv.org/pdf/1609.03677v1.pdf>, 2017 (9 pgs).
Hoiem et al.,"Recovering surface layout from an image," Retrieved from Internet <URL: http://dhoiem.cs.illinois.edu/publications/hoiem_ijcv2007SurfaceLayout.pdf>, 2007 (23pgs).

(56) References Cited

OTHER PUBLICATIONS

Ioffe et al.,"Batch normalization: Accelerating deep network training by reducing internal covariate shift," Retrieved from Internet <URL: https://arxiv.org/pdf/1502.03167v1.pdf>, 2015 (10 pgs).
Jaderberg et al.,"Spatial transformer networks," In Advances in Neural Information Processing Systems, 2015 (9 pgs).

* cited by examiner

SYSTEMS AND METHODS FOR UNSUPERVISED LEARNING OF GEOMETRY FROM IMAGES USING DEPTH-NORMAL CONSISTENCY

BACKGROUND

Humans are highly competent in recovering the three-dimensional (3D) geometry of observed natural scenes at a very detailed level in real-time, even from a single image. Being able to perform reconstruction for monocular images can be widely applied to a large amount of real applications, such as augmented reality and robotics. One group of approaches solve this problem by feature matching and estimating camera and scene geometries, e.g., structure from motion (SFM), or color matching (e.g., dense tracking and mapping (DTAM)). But these techniques are sensitive to correct matching and are ineffective in homogeneous areas. Another way to perform 3D reconstruction is by using a learning-based method where the reconstruction cues can be incrementally discovered by learning from videos. Currently, with the development of pixel-wise prediction, such as fully convolutional networks (FCN), supervised learning of depth achieves impressive results on public datasets, such as KITTI, NYUv2, and SUN3D. Nevertheless, collecting ground truth depth is almost impossible for random videos. It is difficult for supervised learned models to generalize to videos of different scenes.

Zhou et al. in "*Unsupervised Learning of Depth and Ego-Motion from Video*," in Computer Vision and Pattern Recognition (CVPR), 2017 (also available at arxiv.org/pdf/1704.07813.pdf) (which is incorporated by reference herein in its entirety) recently proposed a single image depth FCN learning from videos. In their training, rather than using ground truth depth, they warp the target image to other consecutive video frames based on predicted depths and relative motion, and match the photometry between the warped frames and observed frames. Then, the matching errors are used as the supervision of the depth prediction. A similar approach was applied for depth prediction when stereo pairs were available. Although those methods are able to perform single-image depth estimation, the results do not well represent the scene structure, especially when visualized with computed normals. This is mostly due to the fact that photometric matching is ambiguous, i.e., a pixel in source frames can be matched to multiple similar pixels in target frames. Although some approaches apply smoothness of depths to reduce the ambiguity, it is often a weak constraint on neighboring pixels, which potentially have similar colors, thus yielding inconsistent normal results.

Accordingly, what is needed are systems and methods that overcome the shortcomings of existing approaches.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures are not to scale.

FIGURE ("FIG.") 1 illustrates a framework according to various embodiments of the present disclosure.

DETAILED DESCRIPTION OF EMBODIMENTS

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each reference mentioned in this patent document is incorporate by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

In this document, the terms "depth network" and "depth layer" are used interchangeably and the terms "normal network" and "normal layer" are used interchangeably. Similarly, "photometric error" and "color error" are used interchangeably. A "normal" refers to a value or normal direction with respect to a 2D or 3D surface, i.e., the value or direction of a normal vector.

A. General Introduction

Embodiments of the present disclosure involve learning-based 3D reconstruction of a single image trained on monocular videos. Various embodiments, utilize learning of a regularized 3D geometry with explicit awareness of normal representation. This is motivated by the fact that humans are more sensitive to normal directions than to depth estimation. For instance, one could precisely point out the normal direction of a surface at each pixel of a single image while one could only roughly know the absolute depth. Thus, various embodiments of the present disclosure incorporate an edge-aware depth-normal consistency constraint inside the network which better regularizes the learning of depths. With the help of such a constrain, in embodiments, the recovered geometry is comparably better than for existing approaches.

There are several advantages of estimating normals. For instance, it provides an explicit understanding of normals for learned models. In addition, it provides higher order interaction between estimated depths, which reaches beyond local neighbor relationships. Additional operations (e.g., Manhattan assumption) over normals may also be integrated. As depth/normal discontinuity often appears at object edges in the image, various embodiments incorporate the image edges in this constraint to compensate for the discontinuity.

Using depth-normal consistency, extensive experimental results were obtained, which show significant improvement over state-of-the-art methods on depth estimation as well as an improvement over predicted normals. More importantly, training was shown to converge about three times faster than for existing methods. These results demonstrate the efficiency and effectiveness of various embodiments of the present disclosure in correctly predicting both depths and normals.

B. Related Work

Structure from Motion and Single View Geometry.

As discussed in the Introduction section, geometry-based methods, such as SFM, ORB-SLAM, DTAM, rely on feature matching, which can be effective and efficient in many cases. However, these methods oftentimes fail at low texture, or when drastic changes of visual perspective, etc., occur. More importantly, these approaches cannot extend to single-view reconstruction where humans excel. Traditionally, specific rules are developed for single-view geometry. Existing methods are dependent on either computing vanishing point, following rules of bidirectional reflectance distribution function (BRDF), or abstracting the scenes with major plane and box representations. Typically, those methods can obtain only sparse geometry representations and some of them require certain assumptions.

Supervised Single View Geometry Via Convolutional Neural Network (CNN).

With the advance of deep neural networks and their strong feature representation, dense geometry, e.g., pixel-wise depth and normal maps, can be readily estimated from a single image. One existing learned CNN model shows significant improvement compared to other strategies that are based on hand-crafted features. Some approaches attempt to improve the estimation further by appending a conditional random field (CRF). However, most approaches regard depth and normal predictions as independent tasks. Some point out their correlations over large planar regions and regularize the prediction using a dense CRF, which improves the results of both depth and normal. However, generally, all those methods require densely labeled ground truths, which are expensive to label in natural environments.

Unsupervised Single-View Geometry.

Videos are easy to obtain at the present age and hold much richer 3D information than single images. Thus, whether single-view geometry can be learned through feature matching from videos attracts a lot of interest. Recently, several deep learning methods have been proposed based on such an intuition. For example, Deep3D learns to generate the right view from a given left view by supervision of a stereo pair. In order to perform backpropagation to depth values, the method quantizes the depth space and trains to select the correct one. Some approaches apply a similar supervision from stereo pairs. While keeping the depth continuous, they apply Taylor expansion to approximate the gradient for depth. Some extend this approach to include depth smoothness loss and left-right depth consistency. One recent approach induces camera pose estimation into the training pipeline, which enables depth learning from monocular videos, and uses an explainability mask to reduce the problem of moving objects in rigid scenes. Some authors propose a network to include modeling rigid object motion. Although mainly developed for depth estimation from video, normal information, which is also highly interesting for geometry prediction, has not been considered inside the pipeline.

C. Preliminaries

Figure 2A:
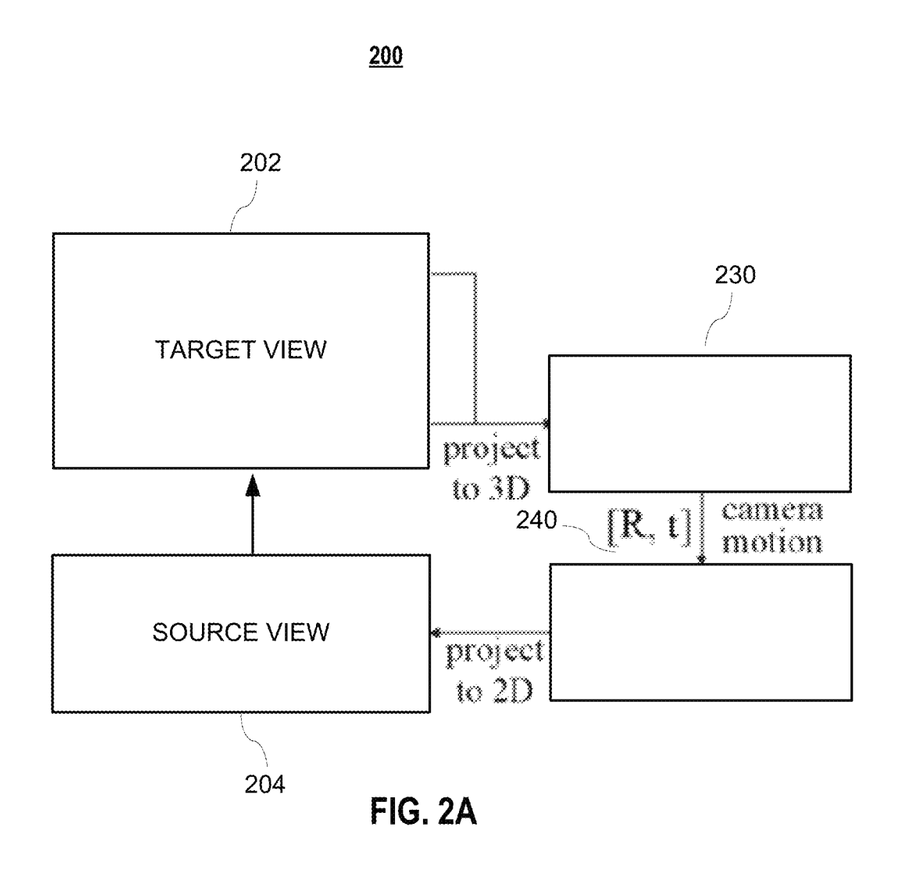
FIG. 2A illustrates 3D inverse warping according to various embodiments of the present disclosure.
Figure 2B:
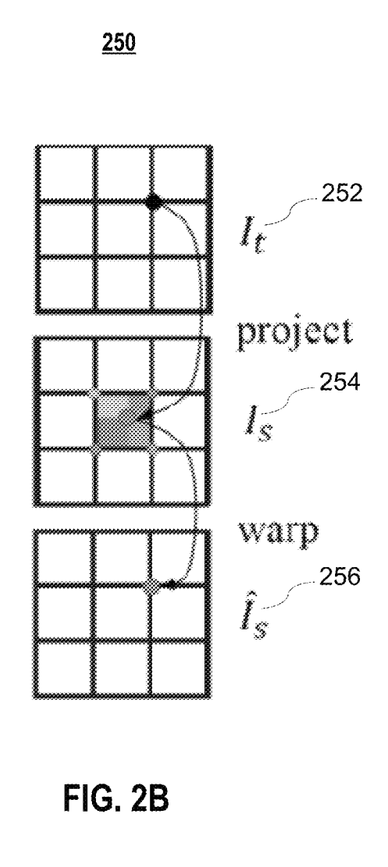
FIG. 2B illustrates bilinear interpolation according to various embodiments of the present disclosure.

Introduced are several preliminaries that have been proposed for unsupervised learning pipelines. As discussed above, one main idea involves inverse warping from target view to source view with awareness of 3D geometry, which is illustrated in FIG. 2. Exemplified in FIG. 2A is inverse warping according to various embodiments of the present disclosure, whereas FIG. 2B depicts bilinear interpolation.

Perspective Projection Between Multiple Views.

Let $D(x_t)$ be the depth value of the target view at image coordinate $x_t$, and K be the intrinsic parameter of the camera. Suppose the relative pose from the target view to source view is a rigid transformation $T_{t \to s} = [R|t] \in S\mathcal{E}(3)$, and h(x) is the homogeneous coordinate given x. The perspective warping to localize corresponding pixels can be formulated as, $$D(x_s)h(x_s) = KT_{t \to s}D(x_t)K^{-1}h(x_t), \quad \text{(Eq. 1)}$$

and the image coordinate $x_s$ may be obtained by dehomogenisation of $D(x_s)h(x_s)$. Thus, $x_s$ and $x_t$ are a pair of matching coordinates, and we are able to compare the similarity between the two to validate the correctness of structure.

Photometric Error from View Synthesis.

Given pixel matching pairs between target view 202 and source views 204, i.e., $I_t$ 252 and $I_s$ 254, a target view $\hat{I}_s$ 256 may be synthesized from the given source view 204, e.g., through bilinear interpolation 250 as illustrated in FIG. 2B. Then, under the assumption of Lambertian and a static rigid scene, the average photometric error may be used to recover the depth map D 230 for target view 202 and relative pose 240. However, this assumption is not always valid due to the fact of moving objects and occlusion. Thus, an explainability mask M may be induced to compensate for this. Formally, the masked photometric error is $$\mathcal{L}_{vs}(D, \mathcal{T}, \mathcal{M}) = \Sigma_{s=1}^{S} \Sigma_{x_t} M_s(x_t) |I_t(x_t) - \hat{I}_s(x_t)|,$$

$$s.t. \ \forall x_t, s \ M_s(x_t) \in [0,1], D(x_t) > 0 \quad (\text{Eq. 2})$$

where $\{\hat{I}_s\}_{s-1}^{S}$ is the set of warped source views, and T is a set of transformations from target view to each of the source views. $\mathcal{M} = \{M_s\}$ is a set of explainability masks, and $M_s(x_t) \in [0, 1]$ weighs the error at $x_t$ from source view s.

Regularization.

As mentioned previously, supervision based solely photometric error is ambiguous. One pixel could match to multiple candidates, especially in low-texture regions. In addition, a trivial solution for the explainability mask would result from setting all values to zero. Thus, in embodiments, to reduce depth ambiguity and encourage non-zero masks, two regularization terms may be applied, $$\mathcal{L}_s(D, 2) = \Sigma_{x_t} \Sigma_{d \in x, y} |\nabla_d^2 D(x_t)| e^{-\alpha |\nabla_d I(x_t)|},$$

$$\mathcal{L}_m(\mathcal{M}) = -\Sigma_s \Sigma_{x_t} \log P(M_s(x_t) = 1) \quad (\text{Eq. 3})$$

$\mathcal{L}_s(D, 2)$ is a spatial smoothness term that penalizes L1 norm of second-order gradients of depth along both x and y directions, encouraging depth values to align in planar surface when no image gradient appears. Here, the number 2 represents the 2nd order for depth. $\mathcal{L}_m(\mathcal{M})$ is the cross-entropy between the masks and maps with value 1.

In embodiments, multi-scale strategy may be applied to the depth output, and the total loss for depth estimation from videos may be a joint functional from previous terms, $$\mathcal{L}_o(\{D_l\}, \mathcal{T}, \mathcal{M}) = \Sigma_l \{\mathcal{L}_{vs}(D_l, \mathcal{T}, \mathcal{M}) + \lambda_s \mathcal{L}_{vs}$$
$$(D_l) + \lambda_m \mathcal{L}_m(\mathcal{M}_l)\} \quad (\text{Eq. 4})$$

Given the objective functional, the photometric error may be backpropagated to depth, pose and mask networks by applying the spatial transform operation, which supervises the learning process.

D. Geometry Estimation with Edge-Aware Depth-Normal Consistency

Given a target image I, certain embodiments aim at learning to estimate both depths and normals simultaneously. Formally, let N be a set of normals predicted by a model, in embodiments, N may be embedded into the training pipeline and be used as a regularization for depths estimation D to train a more robust model.

1. Framework

Figure 1:
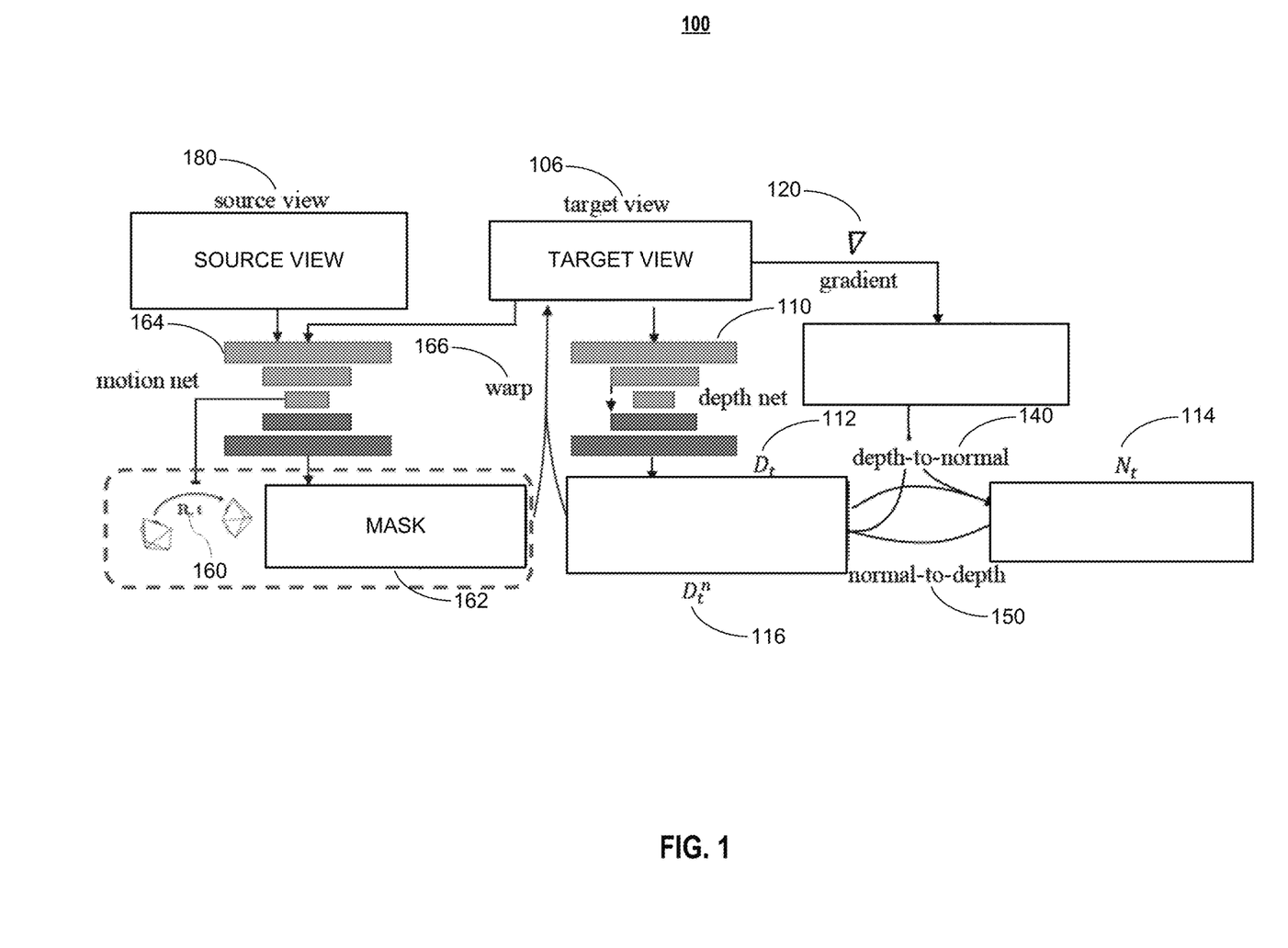

FIG. 1 illustrates a framework according to various outputs a per-pixel depth of the present disclosure. Framework 100 comprises target view 106, depth network 110, depth map $D_t$ 112 and normal map $N_t$ 114, new depth map $D_t''$ 116, depth-to-normal layer 140, normal-to-depth layer 150, inverse warping 166, source view(s) 180, motion network 164, camera pose 160, and mask 162.

In embodiments, in a training phase, supervision may be applied from view synthesis. Depth network 110 make take target view 106 as input and output per-pixel depth map 112, based on which a normal map 114 may be generated by depth-to-normal layer 140. Then, given depth map 112 and normal map 114, new depth map 116, may be estimated from normal-to-depth layer 150, e.g., by using a local orthogonality correlation between depth and normals. Both layers 140, 150 may use image gradient data 120 to avoid non-compatible pixels involved in depth and normal conversion 140, 150. In embodiments, new depth map 116, combined with camera poses 160 and mask 162 predicted from motion network 164, may then be used to inversely warp 166 source view(s) 180 to reconstruct target view 106. Errors may be backpropagated through both networks 110, 164.

In embodiments, the normal representation may serve as a regularization for depth estimation. Further, for training loss, in addition to the photometric reconstruction loss, smoothness over normals may be added to induce higher order interaction between pixels. In embodiments, after the model is trained, given a new image, a per-pixel depth value may be inferred, and the normal value may be computed to yield consistent results between the two predictions.

2. Depth and Normal Orthogonality

In reconstruction, depth and normal are strongly correlated and follow locally linear orthogonality. Formally, for each pixel $x_i$, such a correlation may be written as a quadratic minimization for a set of linear equations, $$\mathcal{L}_{x_i}(D,N) = \|[\ldots \omega_{ji}(\phi(x_j) - \phi(x_i)), \ldots]^T N(x_i)\|^2,$$

where $\phi(x) = D(x) K^{-1} h(x), \|N(x_i)\|_2 = 1,$ $$\omega_{ji} > 0 \text{ if } x_j \in \mathcal{N}(x_i) \quad (\text{Eq. 5})$$

where $\mathcal{N}(x_i)$ is a set of predefined neighborhood pixels of $x_i$, and $N(x_i)$ is a 3×1 vector. $\phi(x)$ is the backprojected 3D point from 2D coordinate x. $\phi(x_j) - \phi(x_i)$ is a difference vector in 3D, and $\omega_{ji}$ is used to weigh the equation for pixel $x_j$ with respect to $x_i$, as will be discussed in greater detail below.

As discussed in Section B, most existing methods try to predict the two pieces of information independently without considering such a correlation, while only SURGE proposes to apply the consistency by a post CRF processing only over large planar regions. In embodiments, consistency is enforced over the full image, and directly applied to regularize the network to help the model learning. Specifically, to model consistency, embodiments utilize two layers, e.g., by solving Eq. 5, i.e., a depth-to-normal layer and a normal-to-depth layer.

Infer Normals from Depths.

In embodiments, given a depth map D, for each point $x_i$, normals may be inferred from depths in order to obtain $N(x_i)$ From Eq. 5, neighbors $\mathcal{N}(x_i)$ and weights $\omega_{ji}$ are defined, and then the set of linear equations is solved. In embodiments, an 8-neighbor convention is used to compute normal directions, which are considerably more robust than those of the 4-neighbor convention. It is understood that not all pixels have to be equally weighed since, e.g., depth discontinuity and/or dramatic normal changes that may occur nearby. In embodiments, weights $\omega_{ji}$ may be computed based on image gradient data. In embodiments, to compute $\omega_{ji}$, neighboring pixels $x_j$ having similar color to $x_i$ are weighed more than those that are dissimilar in color. Formally $\omega_{ji}$ may be computed as $\omega_{ji} = \exp\{\alpha |I(x_j) - I(x_i)|\}$ and $\alpha = 0.1$.

Figure 3:
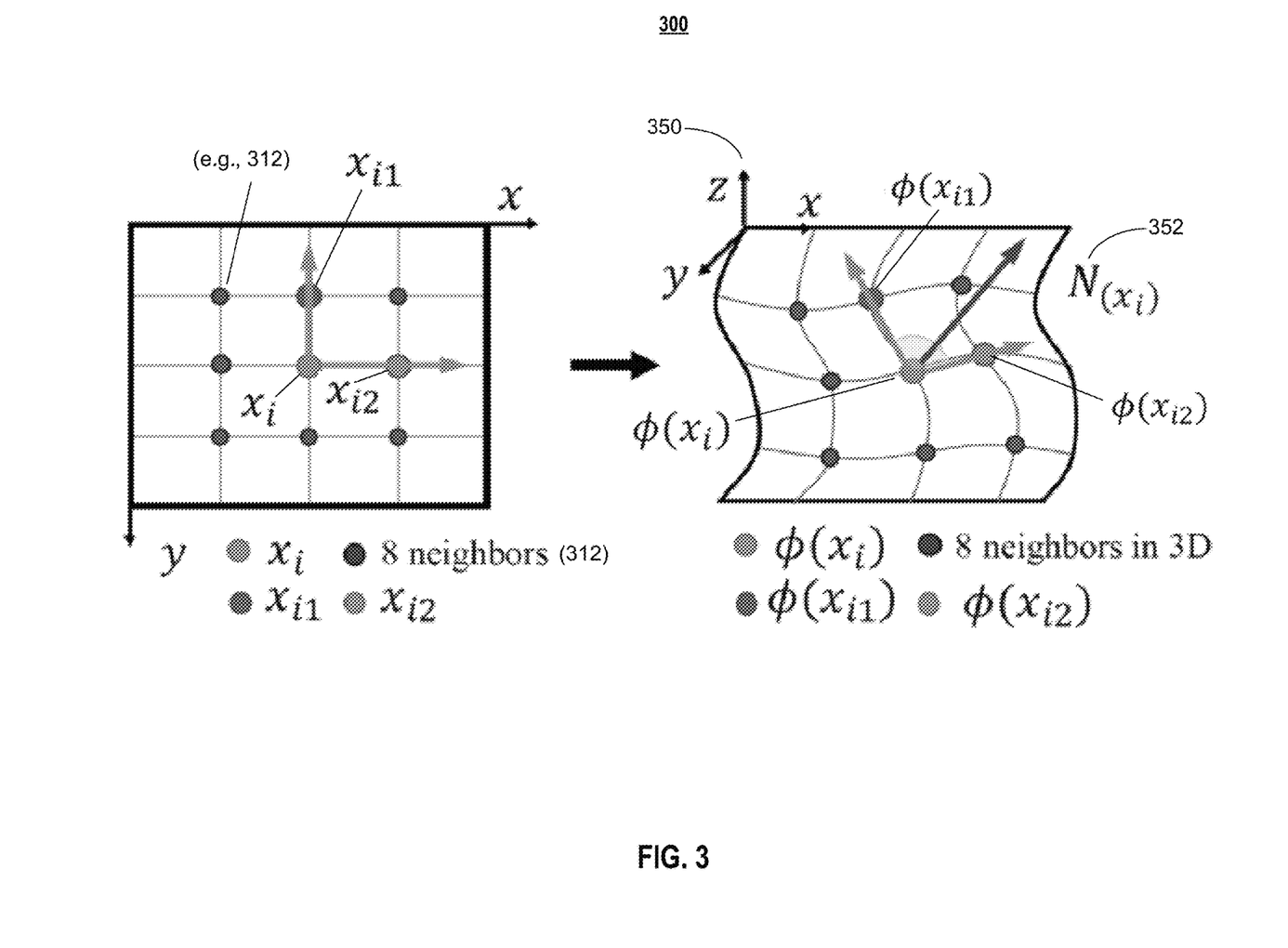
FIG. 3 illustrates computing normal base on a pair of neighboring pixels according to various embodiments of the present disclosure.

For minimizing Eq. 5, one may apply a standard singular value decomposition (SVD) to obtain the solution. In embodiments, such an operation is embedded into the network for training, and the gradient is backpropagated with respect to input depths. SVD is computationally non-efficient for backpropagation. Thus, in embodiments, mean cross-product is used to approximate the minimization, which is simpler and more efficient. Specifically, the 8-neighbor pixels 312 around $x_i$=[m, n], may be split into 4 pairs, such that each pair of pixels is perpendicular in a 2D coordinate space with respect to $x_i$, e.g., in a counter clockwise order, i.e., $\mathcal{P}(x_i)$={([m−1, n], [m, n+1], . . . , ([m+1, n−1], [m−1, n−1])).

Then, for each pair, the cross-product of a difference vector with respect to $x_i$ may be computed, and the mean direction of the computed vectors may be set as the normal direction of $x_i$. Formally, the solver for normals may be written as $$n = \Sigma_{p \in P}(\omega_{p_0,x_i}(\phi(p_0)-\phi(x_i)) \times \omega_{p_1,x_i}(\phi(p_1)-\phi(x_i))),$$

$$N(x_i) = n/\|n\|_2 \quad \text{(Eq. 6)}$$

The process of calculating normal direction 352 for $x_i$ using one pair of pixels is shown in FIG. 3, which illustrates computing normal base on a pair of neighboring pixels. As depicted in FIG. 3, points $x_i$, $x_{i1}$, $x_{i2}$ are 2D points, and $\phi(x_i)$, $\phi(x_{i1})$, $\phi(x_{i2})$ are corresponding points projected to 3D space 350. In embodiments, normal direction 352 $N(x_i)$ may be computed with cross product between $\phi(x_{i1})-\phi(x_i)$ and $\phi(x_{i2})-\phi(x_i)$.

Compute Depths from Normals.

Since there are no ground truth normals for supervision, in embodiments, depths are recovered from normals to receive the supervision from the photometric error. To recover depths, given a normal map N, and to make Eq. 5 solvable, in embodiments, an initial depth map $D_o$ is provided as input, which might lack normal smoothness, e.g., depth map from network output. Then, given $D_o(x_i)$, the depth solution for each neighboring pixel of $x_i$ is unique and can be easily computed. Formally, let $D_e(x_j|x_i)=\psi(D_e(x_i), N(x_i))$ be the solved depth value calculated for a neighbor pixel $x_j$ with respect to $x_i$. In embodiments, when computing over the full image, for each pixel, 8 equations may be jointly solved for the 8 neighbor pixels. In embodiments, by minimum square estimation (MSE), the solution for depth of $x_i$ is, $$D_n(x_j) = \Sigma_{i \in \mathcal{N}} \hat{\omega}_{ij} D_e(x_j|x_i), \hat{\omega}_{ij} = \omega_{ij}/\Sigma_i \omega_{ij} \quad \text{(Eq. 7)}$$

3. Training Losses

Given the consistency, to supervise both the depth and normal predictions, embodiments directly apply the loss, e.g., in Eq. 4, by replacing the output from network $D_o$ with the output after the normal-to-depth layer $D_n$ to train the model. Experiments (See Sec. E) demonstrate a significant improvement in depth estimation over state-of-the-art methods that use a similar network architecture.

Embodiments use smoothness over neighboring normal values to provide higher order interaction between pixels. Formally, the smoothness for normals may have the same form as $\mathcal{L}_s$ in Eq. 3 for depth, while the first order gradient may be applied, i.e., $\mathcal{L}_s(N, 1)$. In embodiments, matching corresponding pixels between frames is used to find the correct geometry. In addition to the photometric error from matching pixel colors, in embodiments, image gradients may be matched since matching image gradient is more robust to lighting variations. In embodiments, a gradient map of the target image and at least one synthesized target image is computed, and a gradient matching error is included into the loss function. Formally, the loss may be represented as $$\mathcal{L}_g(D_n, \mathcal{T}, \mathcal{M}) = \Sigma_{s=1}^S \Sigma_{x_t} M_s(x_t) \|\nabla I_t(x_t) - \nabla \hat{I}_s(x_t)\|_1$$

such that the learning objective for multi-scale learning may be expressed as $$\mathcal{L}_{(D, \mathcal{N}, \mathcal{T}, \mathcal{M})} = \mathcal{L}_o(\{D_{nl}\}, \mathcal{T}, \mathcal{M}) + \Sigma_l \{\lambda_g \mathcal{L}_g(D_{nl}, \mathcal{T}, \mathcal{M}) + \lambda_n \mathcal{L}_s(N_l, 1)\} \quad \text{(Eq. 8)}$$

where $D=\{D_{nl}\}$ and $\mathcal{N}=\{N_l\}$ are the set of depth maps and normal maps for the target view.

Model Training.

In embodiments, the DispNet network architecture with skip connections may be adopted. All cony layers may be followed by a ReLU activation, e.g., except for the top prediction layer. The network may be trained from scratch, e.g., since too many losses at beginning may be difficult to optimize. In embodiments, a two-stage training strategy comprises training the network with $\mathcal{L}_o$ with 5 epochs and then fine-tuning the model by using the full loss for 1 epoch. An ablation study of each term is provided below.

Figure 4:
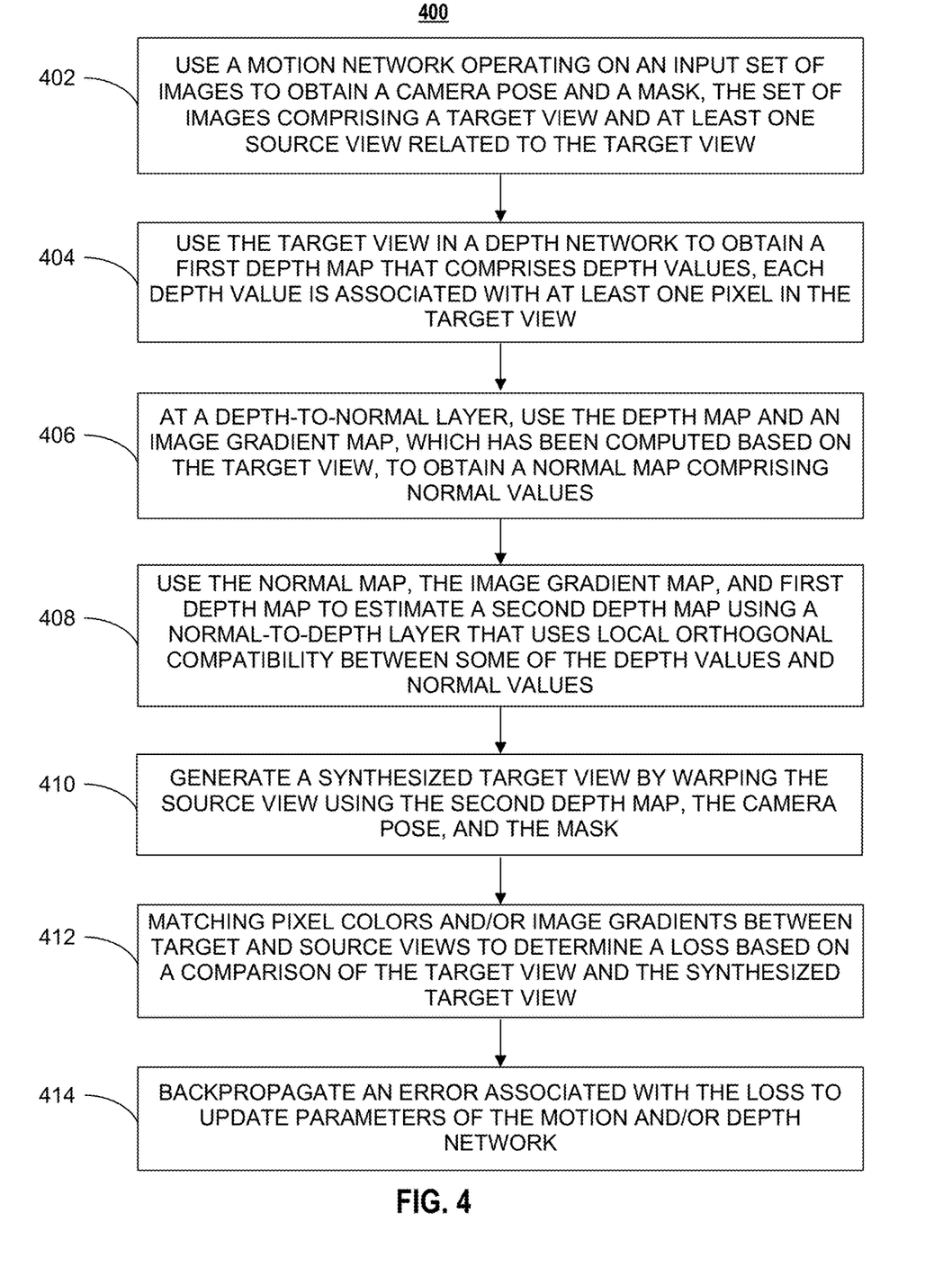
FIG. 4 is a flowchart for training a model on a set of unlabeled images to predict depths in an image in accordance with various embodiments of the present disclosure.

FIG. 4 is a flowchart for training a model on a set of unlabeled images to predict depths in an image in accordance with various embodiments of the present disclosure. In embodiments, process 400 uses (402) a motion network that operates on an input set of images in order to obtain a camera pose and a mask. The set of images comprises a target view and at least one source view that is related to the target view. In embodiments, the source view comprises two images, one that precedes the target view and one that succeeds the target view.

In embodiments, process 400 uses (404) the target view in a depth network to obtain a depth map that comprises depth values. Each depth value may be associated with one or more pixels in the target view.

In embodiments, at a depth-to-normal layer, the depth map and an image gradient map that is computed based on the target view may be used (406) to obtain a normal map that comprises normal values.

In embodiments, the normal map, the depth map, and image gradient map may be used (408) to estimate a second depth map, e.g., by using a normal-to-depth layer that takes advantage of a local orthogonality condition between depth values and normal values.

In embodiments, a synthesized target view may be generated (410) by warping or inverse warping the source view, e.g., to the target view by using the second depth map, the camera pose, and the mask.

In embodiments, estimating the second depth map comprises using normal values as a regularization to impose an edge-aware depth-normal consistency constrain between color-similar pixels. In embodiments, weights may be assigned to pixels in a set of neighboring pixels, such that the depth of pixels having similar color are weighed greater than others so as to reduce depth ambiguity caused by color differences between pixels. In embodiments, pixel pairs may be generated from the neighboring pixels to compute a cross product of difference vectors for each pixel pair. The mean of the difference vectors may represent a surface normal direction.

In embodiments, based on a comparison of the target view and the synthesized target view, pixel colors and/or image gradients may be matched (412) between target and source views to determine a loss. In embodiments, determining the loss comprises using an image gradient map associated with the target view and an image gradient map associated with the synthesized target view to enable matching of an image gradient error between the two image gradient maps.

In embodiments, determining the loss may comprise using a smoothness term that is associated with at least one of the depth map and the normal map.

In embodiments, an error associated with the loss may be backpropagated (414) in order to update parameters of the motion network and/or the depth network. In embodiments, backpropagating the error comprises backpropagating to the motion network a color difference between original and projected pixels in a same plane.

Figure 5:
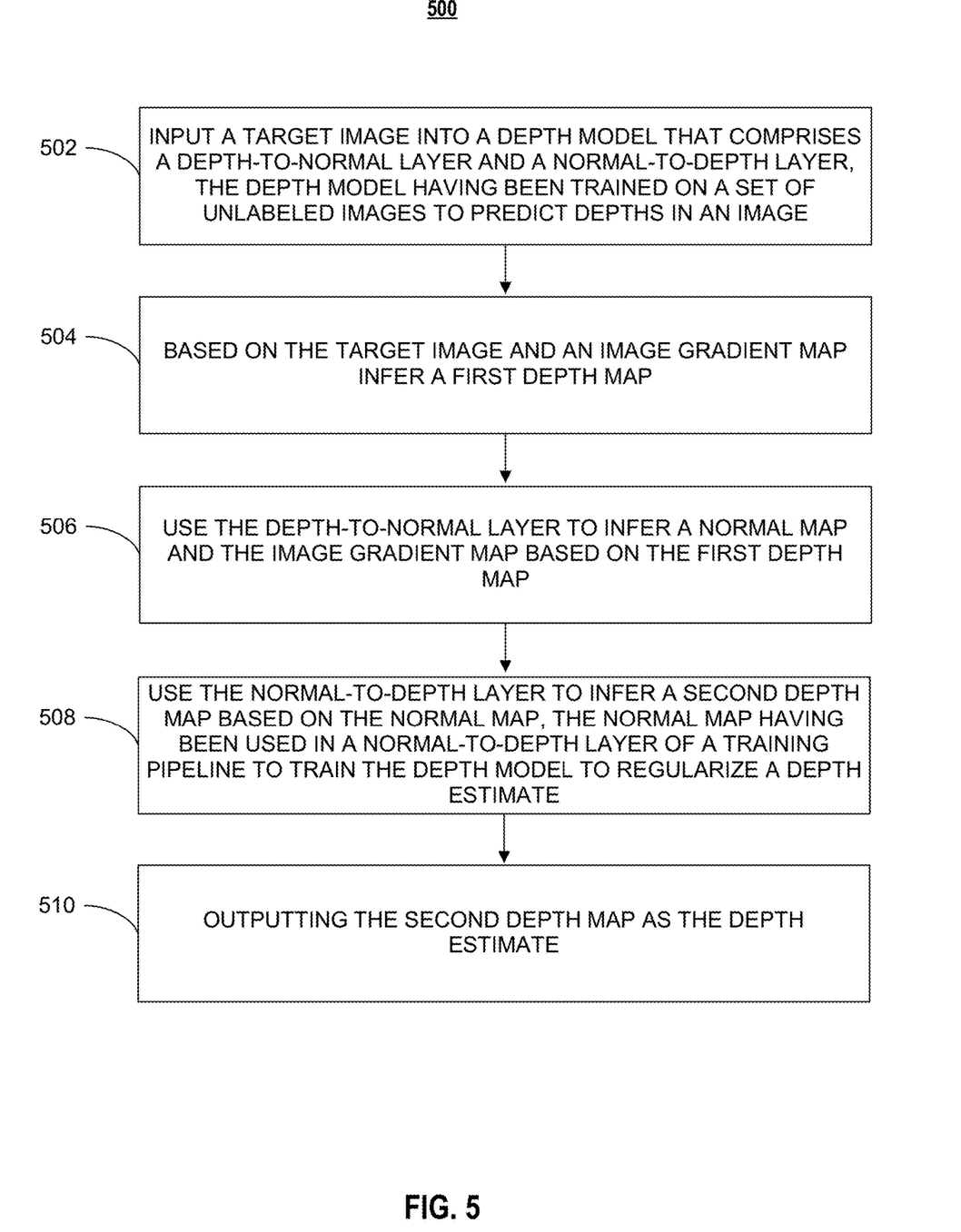
FIG. 5 is a flowchart for predicting depths and normal directions for an image according to various embodiments of the present disclosure.

FIG. 5 is a flowchart for predicting depths and normal directions for an image according to various embodiments of the present disclosure. In embodiments, a target image is input (502) to a depth model that comprises a depth-to-normal layer and a normal-to-depth layer. In embodiments, the depth model has been trained on a set of unlabeled images to predict depths and gradients in an image.

In embodiments, a first depth map maybe inferred (504) based on the target image and an image gradient map.

In embodiments, the depth-to-normal layer may be used (506) to infer a normal map based on the first depth map and the image gradient map, e.g., by making use of a local orthogonal compatibility between the normal map and the depth map.

In embodiments, the normal-to-depth layer may be used (508) to infer a second depth map based on the normal map. In embodiments, the normal map has been used in a normal-to-depth layer of a training pipeline to train the depth model to regularize a depth estimate. In embodiments, image gradient data may be applied to the depth-to-normal layer to avoid non-compatible pixels.

Finally, the second depth map may be output (510) as the depth estimate.

E. Experiments

In this section, implementation details, datasets, and evaluation metrics are introduced. An ablation study of how much each component of the framework contributes and a performance comparison with other supervised or unsupervised methods are also presented.

1. Implementation Details

Various embodiments may be implemented using publicly available platforms, such as the TensorFlow platform, and have 34 million trainable variables. During training, an Adam optimizer may be applied, e.g., with parameters $\beta_1=0.9$, $\beta_2=0.000$, $\varepsilon=10^{-8}$. Learning rate and batch size may be set to be $2\times10^{-3}$ and 4, respectively. In embodiments, loss balancing for $\lambda_s$ and $\lambda_m$ may be used and depth may be correct by a scale factor, e.g., by setting $\lambda_n=1$ and $\lambda_g=\lambda_s$.

The length of input sequence may be fixed at 3 and the input frames may be resized to 128×416. In embodiments, a middle frame may be treated as target image and the two neighboring images as source images. In experiments, the network starts to show meaningful results after 3 epochs and converges at the end of the 5th epoch. With a Nvidia Titan X (Pascal), the training process may take around 6 hours. Experimental results show that the number of epochs and absolute time needed is significantly less than for existing approaches.

2. Datasets and Metrics

Training.

It is noted that embodiments of the present invention may be trained on any frame sequence captured with a camera, e.g., a monocular camera. Certain embodiments are evaluated on known datasets, e.g., datasets comprising raw data comprising RGB and/or gray-scale videos captured by stereo cameras from different scenes and having a known image size.

In embodiments, videos captured by both left and right cameras may be used for training and be treated independently. Using common training sequences that exclude frames from test scenes and static sequences may result in any number of training sequences and validation sequences. In embodiments, no data augmentation is performed.

Testing.

In embodiments, the same depth evaluation and normal evaluation metrics as used by others may be used to facilitate direct comparison of performance. For depth evaluation, existing code, such as the code provided by Zhou et al., may be used, and for normal evaluation, an embodiment of the normal calculation may be implemented. The correctness may be verified through validating normal results.

3. Ablation Study

To investigate different components proposed in Sec. D, an ablation study may be performed, e.g., by removing components from the full model and evaluating the results.

Depth-Normal Consistency.

By removing the normal-to-depth layer (Eq. 7), the inverse warping process (Sec. C) takes an image and directly predicts a depth map from the input. This leads to a performance that falls below that of the full model. In embodiments, by using depth-normal consistency, the network not only performs better but converges faster. For example, the full model may converge after 5 epochs, while the network without such consistency may converge at the 15th epoch.

Image Gradient in Smoothness Term.

In one embodiment, to validate image gradient for depth and normal smoothness in Eq. 3, a may be set to zero. Experimental results show that such embodiments have less impact than depth-normal consistency, but still enhance performance.

Image Gradient in Normal-Depth Consistency.

In one embodiment, co may be set to 1 in Eq. 5, such that there is no edge awareness in depth-normal consistency. The results were not a good as those in which image gradient/edge awareness in depth-normal consistency was used, which demonstrates the effectiveness of enforcing the consistency between color-similar pixels.

Normal Smoothness.

In embodiments, normal smoothness $\mathcal{L}_n$ in Eq. 8 may be removed. Such an embodiment may have less impact on depth than other components of the model, while still making reasonable contributions. However, normal smoothness makes relatively more contributions for normal performance.

4. Comparison with Other Methods

Embodiments use interpolated ground truth depths and reshape an image to improve visualization. For both depths and normals, results of certain embodiments have less artifacts, better reflect the scene layouts, and preserve more detailed structures such as cars.

When comparing normal predictions according to various embodiments of the present disclosure with those computed from the depth maps predicted by Zhou et al. used as a baseline, embodiments outperform the baseline for all metrics. To ensure the model is learned reasonably, two naive baselines may be set up. "Ground truth normal mean" that defines a mean normal direction for all pixels using ground truth normals. "Pre-defined scene" that separates the image into 4 parts using 4 lines connecting each image corner and image center. In embodiments, the bottom part may be set as having an up-directed normal, the left part as having a right-directed normal, the right part as having a left-directed normal, and the top part as having outward directed normals. In experiments, both baselines fared significantly worse than embodiments of the present disclosure, thus, demonstrating the correctness of the learned model.

Indoor Scene Exploration.

In addition to the outdoor dataset, embodiments may be applied to an indoor dataset. For example, as part of preliminary experiments, a subset of the dataset may be chosen and split for training and testing. Qualitative results of a framework according to various embodiments of the present disclosure show that the baseline method fails to predict any reasonable depth maps, whereas embodiments perform reasonably well on scenes that have multiple intersecting planes.

F. Example System Embodiments

Aspects of the present patent document are directed to information handling systems. For purposes of this disclosure, an information handling system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 6:
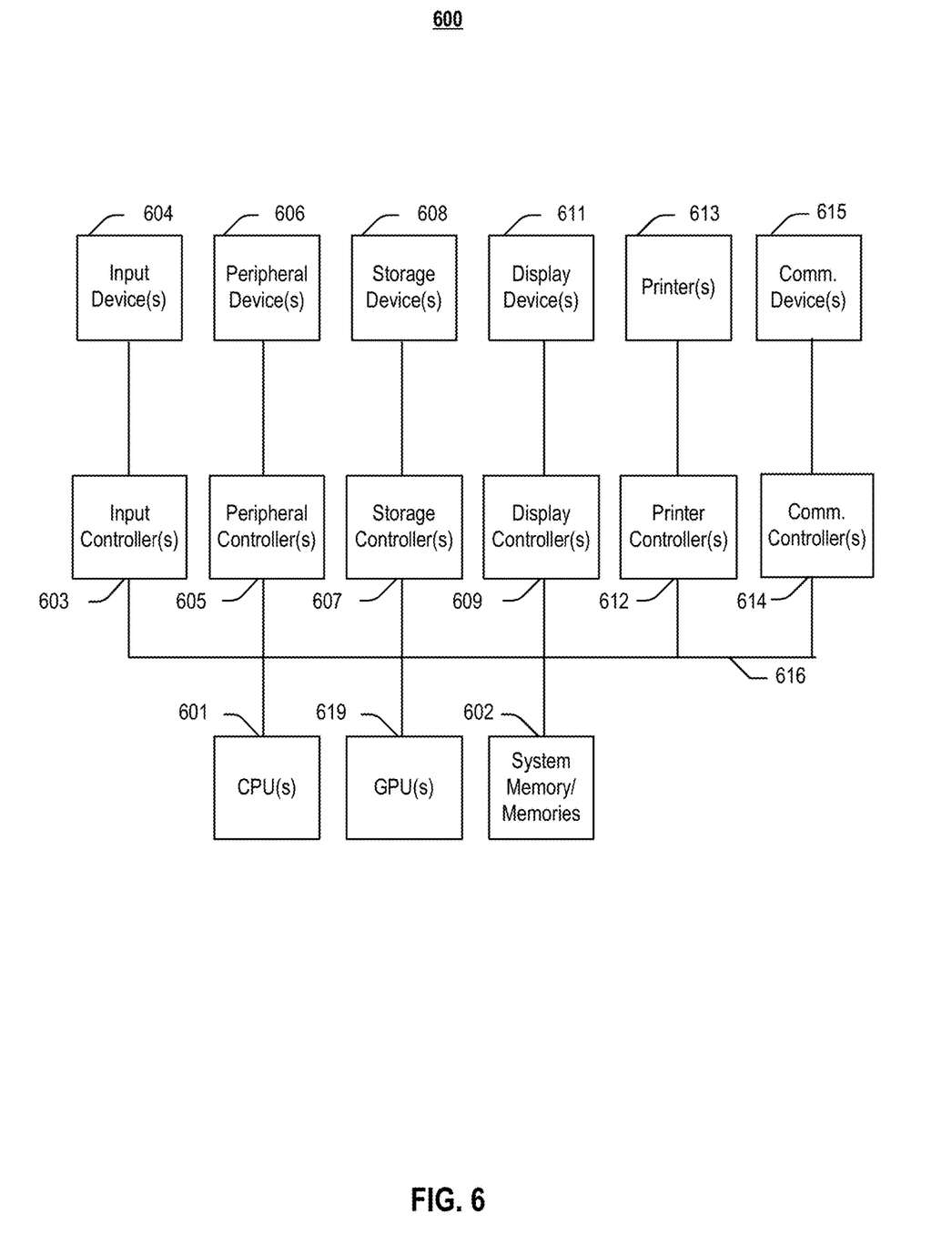
FIG. 6 depicts a block diagram of an information handling system according to embodiments of the present invention.

FIG. 6 depicts a simplified block diagram of a computing device/information handling system (or computing system) according to embodiments of the present disclosure. It will be understood that the functionalities shown for system 600 may operate to support various embodiments of a computing system—although it shall be understood that a computing system may be differently configured and include different components, including having fewer or more components as depicted in FIG. 6.

As illustrated in FIG. 6, the computing system 600 includes one or more central processing units (CPU) 601 that provides computing resources and controls the computer. CPU 601 may be implemented with a microprocessor or the like, and may also include one or more graphics processing units (GPU) 619 and/or a floating-point coprocessor for mathematical computations. System 600 may also include a system memory 602, which may be in the form of random-access memory (RAM), read-only memory (ROM), or both.

A number of controllers and peripheral devices may also be provided, as shown in FIG. 6. An input controller 603 represents an interface to various input device(s) 604, such as a keyboard, mouse, touchscreen, and/or stylus. The computing system 600 may also include a storage controller 607 for interfacing with one or more storage devices 608 each of which includes a storage medium such as magnetic tape or disk, or an optical medium that might be used to record programs of instructions for operating systems, utilities, and applications, which may include embodiments of programs that implement various aspects of the present invention. Storage device(s) 608 may also be used to store processed data or data to be processed in accordance with the invention. The system 600 may also include a display controller 609 for providing an interface to a display device 611, which may be a cathode ray tube (CRT), a thin film transistor (TFT) display, organic light-emitting diode, electroluminescent panel, plasma panel, or other type of display. The computing system 600 may also include one or more peripheral controllers or interfaces 605 for one or more peripherals 606. Examples of peripherals may include one or more printers, scanners, input devices, output devices, sensors, and the like. A communications controller 614 may interface with one or more communication devices 615, which enables the system 600 to connect to remote devices through any of a variety of networks including the Internet, a cloud resource (e.g., an Ethernet cloud, an Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 616, which may represent more than one physical bus. However, various system components may or may not be in physical proximity to one another. For example, input data and/or output data may be remotely transmitted from one physical location to another. In addition, programs that implement various aspects of the invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A method for training a model on a set of unlabeled images to predict depths in an image, the method comprising:
    using a motion network operating on an input set of images to obtain a camera pose and a mask, the set of images comprising a target view and at least one source view related to the target view;
    using, in a depth network, the target view to obtain a first depth map that comprises depth values, each depth value being associated with at least one pixel in the target view;
    at a depth-to-normal layer, using the first depth map and a gradient map that is based on the target view to obtain a normal map that comprises normal values;
    using the normal map, the first depth map, and the gradient map to estimate a second depth map using a normal-to-depth layer;
    generating a synthesized target view by warping at least one source view using the second depth map, the camera pose, and the mask;
    matching at least one of pixel colors and image gradients between target and source views to determine a loss based on a comparison of the target view and the synthesized target view; and
    backpropagating an error associated with the loss to update parameters of at least one of the motion network and the depth network.

2. The method according to claim 1, wherein determining the loss comprises using a first image gradient map associated with the target view and a second image gradient associated map with the synthesized target view to enable matching of an image gradient error between the first and second image gradient maps.

3. The method according to claim 1, wherein determining the loss comprises using a smoothness term that is associated with at least one of the depth map and the normal map.

4. The method according to claim 1, wherein estimating the second depth map comprises using at least some of the normal values as a regularization, the normal values imposing an edge-aware depth-normal consistency constrain between color-similar pixels.

5. The method according to claim 4, wherein regularization comprises assigning weights to pixels in a set of neighboring pixels, such that the depth of pixels having similar color are weighed greater than others so as to reduce depth ambiguity caused by color differences between pixels.

6. The method according to claim 5, wherein obtaining the normal map comprises generating pixel pairs from the set of neighboring pixels to compute for each pixel pair a cross product of difference vectors, the mean of the difference vectors representing a surface normal direction.

7. The method according to claim 1, wherein warping the source view comprises inverse warping the source view to the target view.

8. The method according to claim 1, wherein the source view comprises at least one of an image that precedes the target view and an image that succeeds the target view.

9. The method according to claim 1, wherein backpropagating the error comprises backpropagating to the motion network a color difference between original and projected pixels in a same plane.

10. The method according to claim 1, further comprising:
    using the depth layer to generate a 3D point cloud based on the target view; and
    using the camera pose and the mask to project the 3D point cloud to pixels in a 2D image.

11. The method according to claim 10, wherein projecting the 3D point cloud to the 2D image comprises finding corresponding pixels in the input set of images.

12. A system for training a model on a set of unlabeled images to predict depths in an image, the system comprising:
    one or more processors; and
    a non-transitory computer-readable medium or media comprising one or more sequences of instructions which, when executed by at least one of the one or more processors, causes steps to be performed comprising:
        using, in a depth network, a target view to obtain a first depth comprising depth values that each is associated with at least one pixel in the target view;
        at a depth-to-normal layer, using the depth map and a gradient map to obtain a normal map that comprises normal values;
        based on the normal map, the first depth map, and the gradient map using a normal-to-depth layer to compute a second depth map; and generating a synthesized target view by warping a source view using the second depth map, a camera pose, and a mask.

13. The system according to claim 12, further comprising:
using a loss function that compares a first image gradient associated with the target view and a second image gradient associated with the synthesized target view to reduce an image gradient error between the first and second image gradients; and
backpropagating the image gradient error through the depth network and a motion network to update parameters of at least one of the motion network and the depth network.

14. The system according to claim 13, wherein the loss function regularizes surface normals, such that similar color pixels have similar surface normals.

15. The system according to claim 12, wherein computing the normal map comprises generating pixel pairs from a set of neighboring pixels to compute for each pixel pair a cross product of difference vectors, the mean of the difference vectors representing a surface normal direction.

16. The system according to claim 12, further comprising regularizing a depth estimation to reduce depth ambiguity caused by color differences between pixels by assigning one or more depth weights to pixels in the set of neighboring pixels, such that the depth of pixels having similar color are weighed more than others.

17. The system according to claim 16, wherein the one or more depth weights are computed based on the gradient map.

18. A method for estimating depths and normal values for an image, the method comprising:
inputting a target image into a trained model comprising a depth model, a depth-to-normal layer, and a normal-to-depth layer, the trained model having been trained on a set of unlabeled images to predict depths in an image;
based on the target image and a gradient map that is based on the target image, using the depth model to obtain a first depth map;
using the depth-to-normal layer to obtain a normal map based on the first depth map;
using the normal-to-depth layer and the gradient map to obtain a second depth map based on the normal map, the normal map having been being used in a training pipeline to train the depth model to regularize a depth estimate; and
outputting the second depth map as the depth estimate.

19. The method according to claim 18, wherein obtaining the normal map comprises using local orthogonal compatibility between the normal map and the depth map.

20. The method according to claim 18, further applying image gradient data to the depth-to-normal layer to avoid non-compatible pixels.

* * * * *